(12) United States Patent  (10) Patent No.: US 7,707,712 B2
Kim  (45) Date of Patent: May 4, 2010

(54) APPARATUS FOR ASSEMBLING CAMERA MODULE

(75) Inventor: Duck Hun Kim, Suwon (KR)

(73) Assignee: Samsung Electro-Mechanics Co., Ltd., Suwon-Si (KR)

( * ) Notice: Subject to any disclaimer, the term of this patent is extended or adjusted under 35 U.S.C. 154(b) by 0 days.

(21) Appl. No.: 11/889,497

(22) Filed: Aug. 14, 2007

(65) Prior Publication Data

US 2008/0042333 A1  Feb. 21, 2008

(30) Foreign Application Priority Data

Aug. 17, 2006 (KR) .................. 10-2006-0077674

(51) Int. Cl.
 *H05K 3/30* (2006.01)
(52) U.S. Cl. ............ 29/832; 29/50; 29/52; 29/721; 29/729; 29/757; 29/759; 29/788; 257/433; 257/E31.111; 257/E31.118; 257/E31.128
(58) Field of Classification Search ............. 29/832, 29/50, 52–54, 721, 729, 757, 759, 787; 257/433, 257/778, 798, E31.111, E31.118, E31.128
See application file for complete search history.

(56) References Cited

U.S. PATENT DOCUMENTS 6,798,031 B2 * 9/2004 Honda et al. .......... 257/433
7,227,236 B1 * 6/2007 Lee et al. .............. 257/433

FOREIGN PATENT DOCUMENTS

| | | |
|---|---|---|
| CN | 1373519 A | 10/2002 |
| JP | 63-133928 | 9/1988 |
| JP | 3-1722 | 1/1991 |
| JP | 2002-170288 | 6/2002 |
| JP | 2003-66302 | 3/2003 |
| JP | 2003-324633 | * 11/2003 |
| JP | 2004-130478 | 4/2004 |
| JP | 2005-86659 | 3/2005 |
| KR | 10-0418860 | 2/2004 |
| KR | 10-0607078 | 7/2006 |
| KR | 10-2007-0080083 | 8/2007 |

OTHER PUBLICATIONS

Chinese Office Action issued on Apr. 3, 2009 in corresponding Chinese Patent Application 200710143665.8.
Korean Patent Office Action, mailed Mar. 3, 2008 and issued in corresponding Korean Patent Application No. 10-2006-0077674.
Office Action mailed on Sep. 2, 2008 and issued in corresponding Japanese Patent Application No. 2007-205751.

* cited by examiner

*Primary Examiner*—Thiem Phan
(74) *Attorney, Agent, or Firm*—Staas & Halsey LLP

(57) ABSTRACT

Provided is an apparatus for assembling a camera module comprising a support frame that is formed in a rectangular shape and has a jig horizontally connected to an upper end thereof; a plurality of stages that are vertically stacked and installed in the support frame and adjust a printed circuit board (PCB) in three-axis directions; a board holder that is formed to extend from one end of the uppermost stage and has the PCB mounted on the extending end thereof; and a jig assembly that is disposed on an opening of the jig and has a barrel-integrated housing mounted on the central portion thereof.

5 Claims, 9 Drawing Sheets

[FIG. 1 – Prior Art]
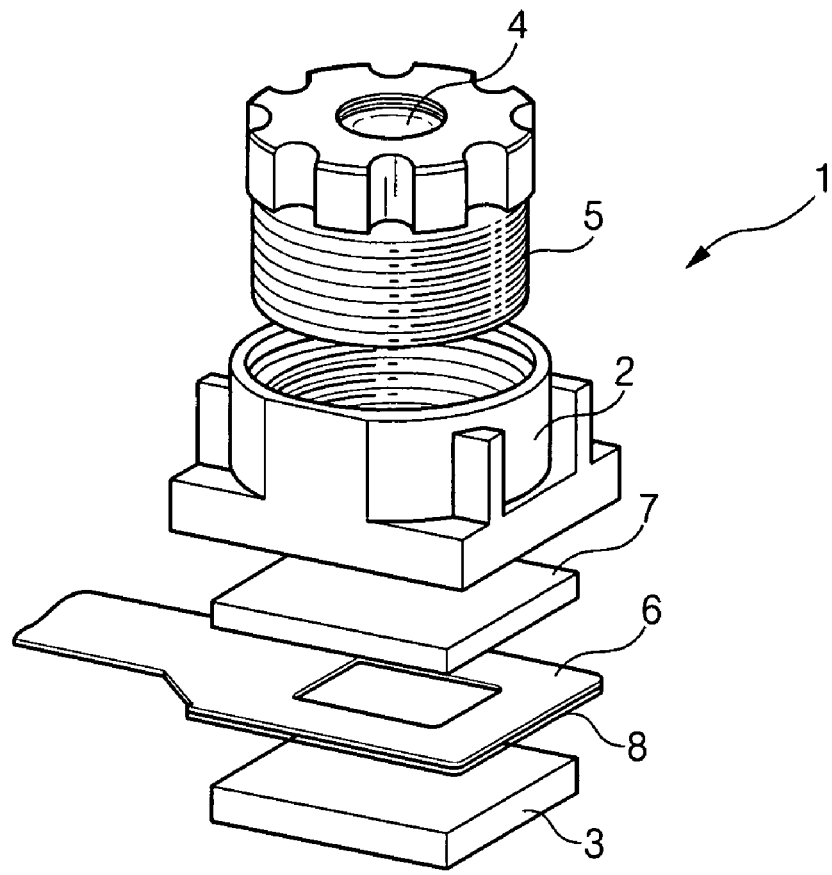
[FIG. 2 – Prior Art]
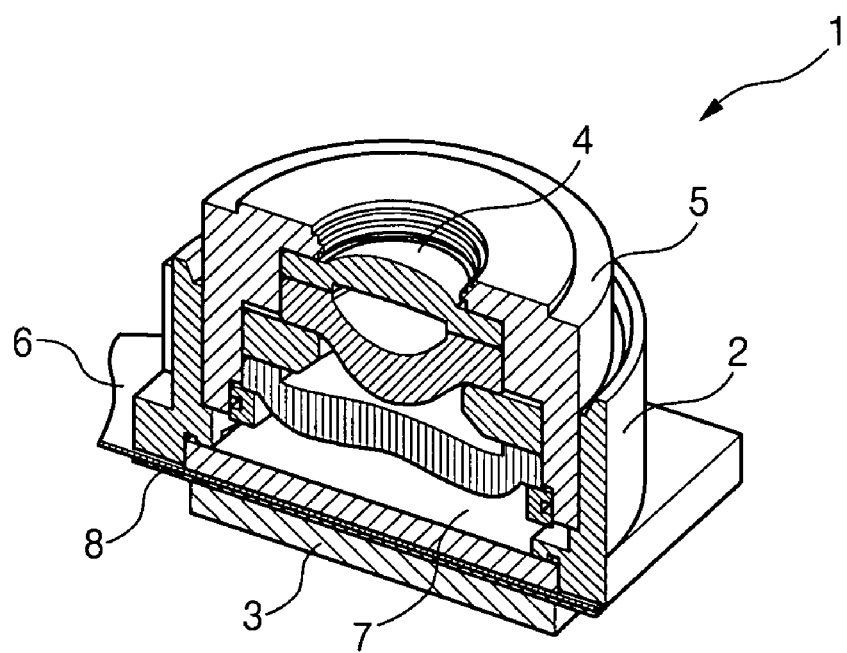

[FIG. 3 – Prior Art]
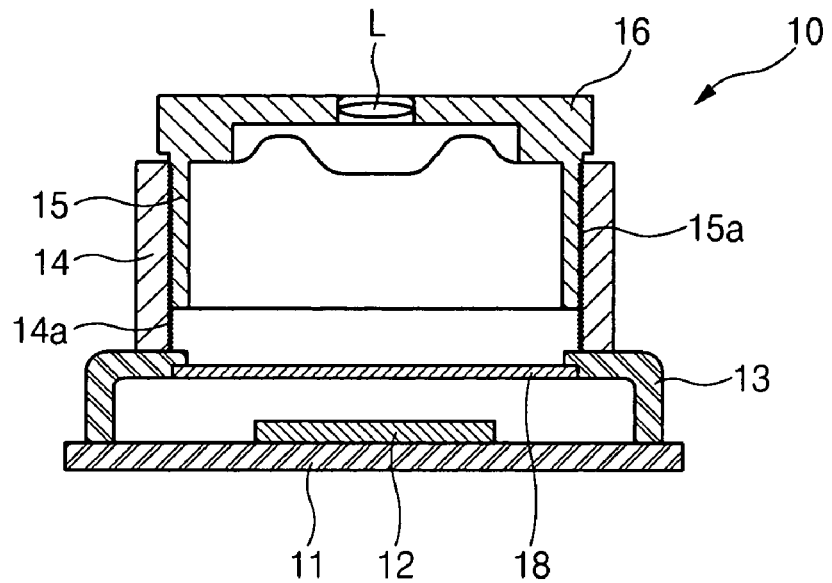
[FIG. 4 – Prior Art]
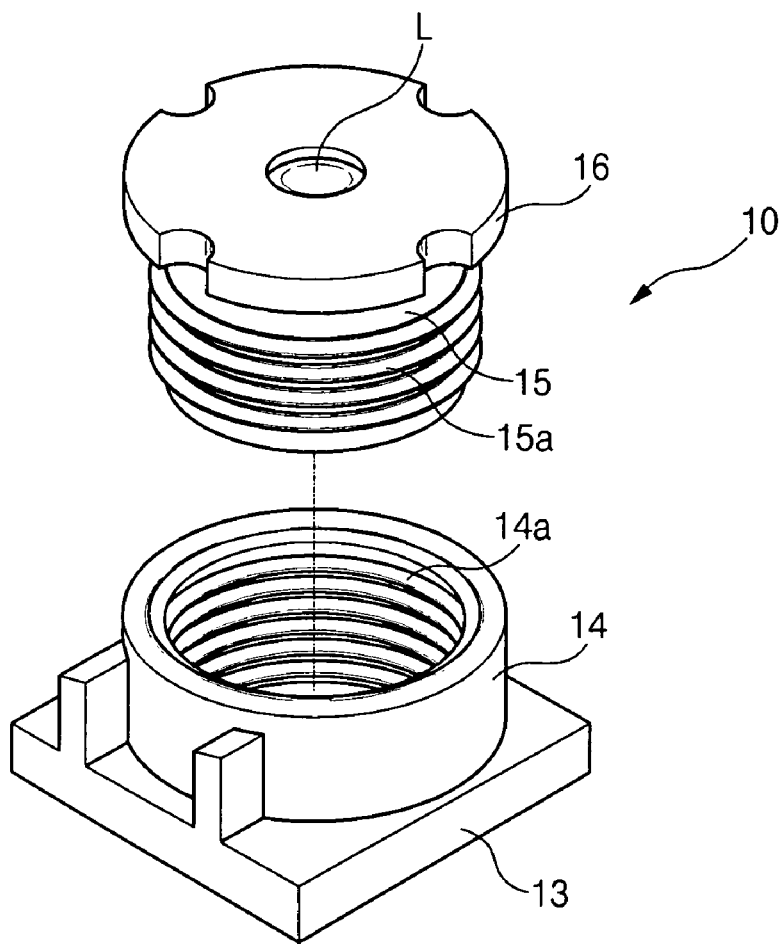

[FIG. 5]
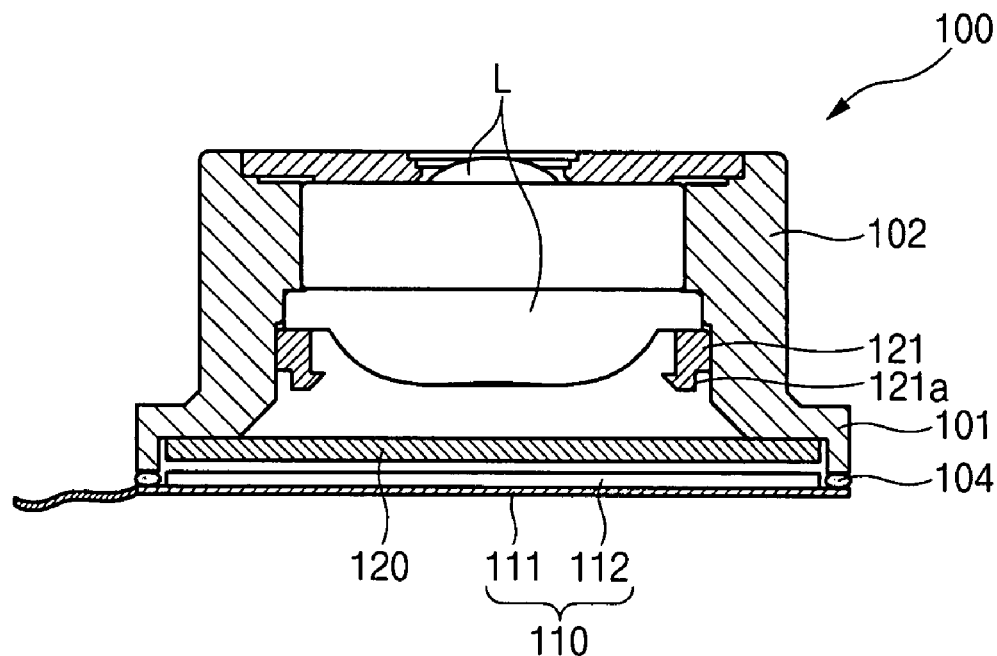
[FIG. 6]
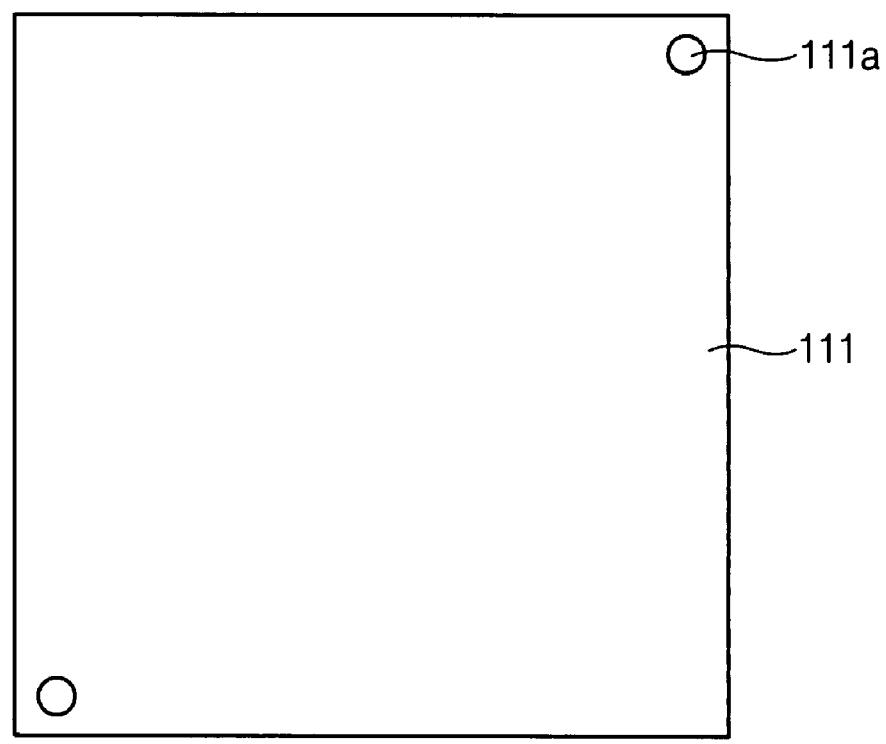

[FIG. 7]
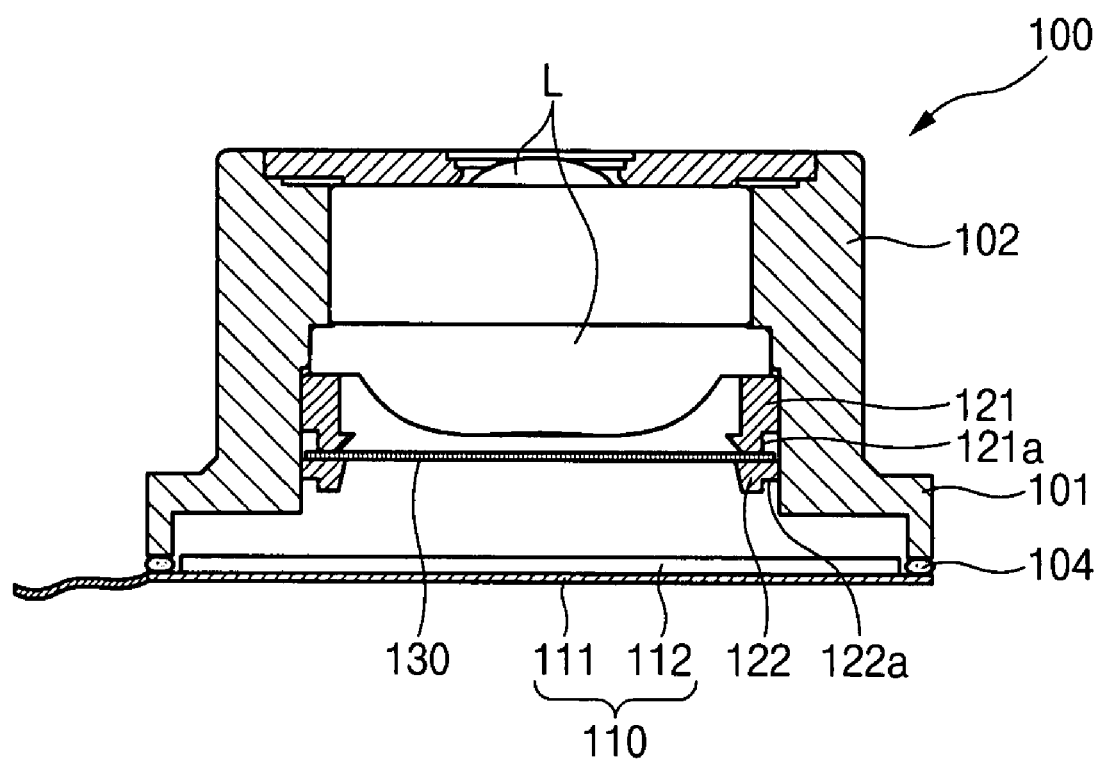

[FIG. 8]
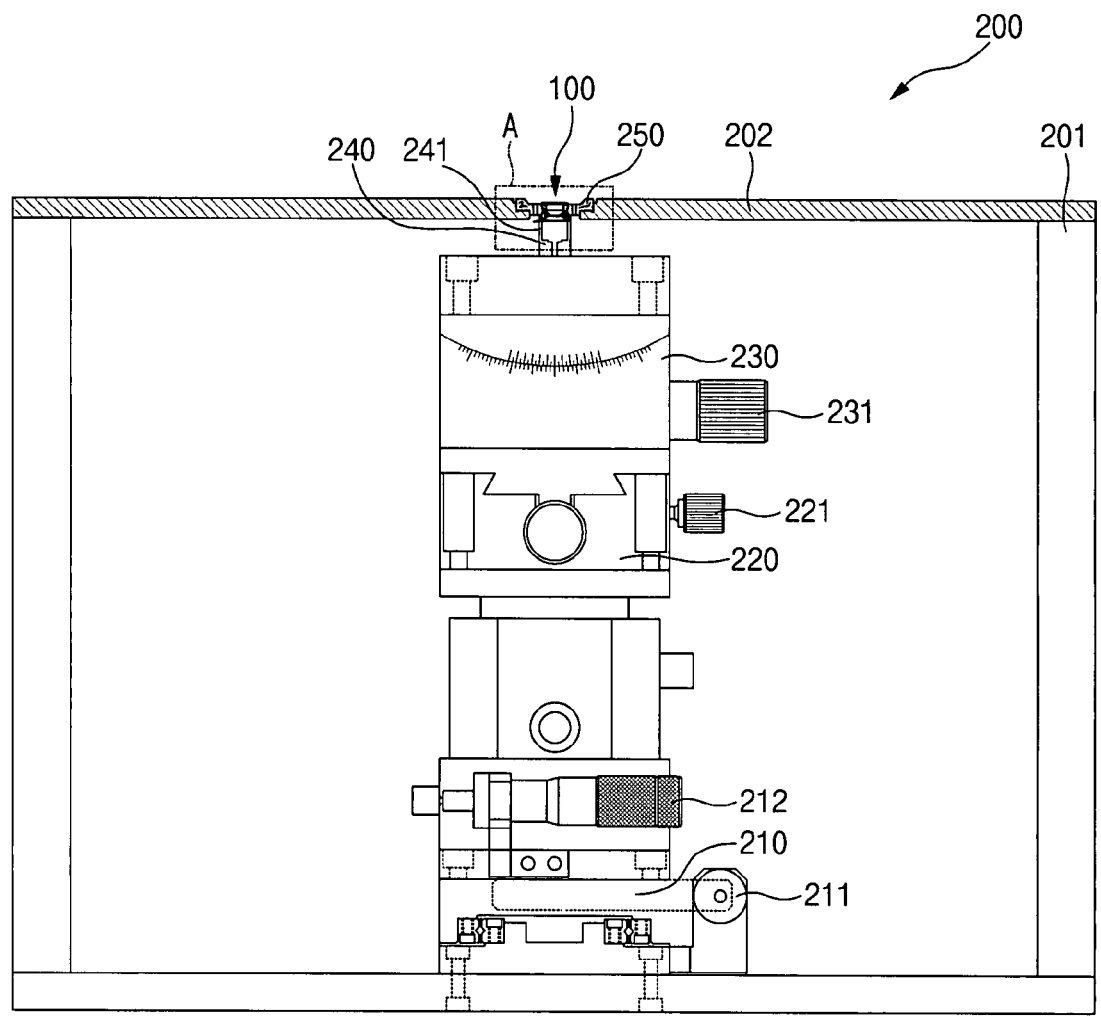
[FIG. 9]
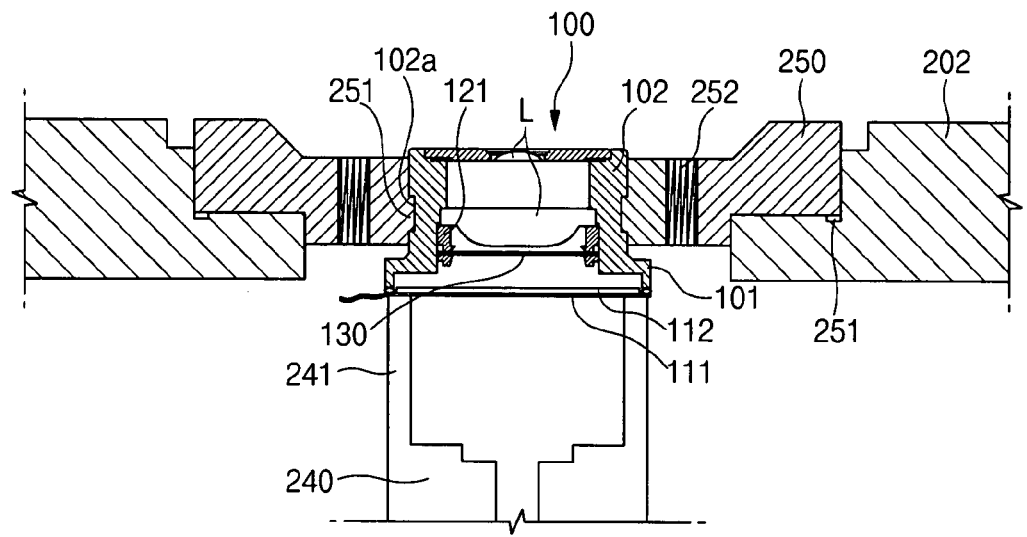

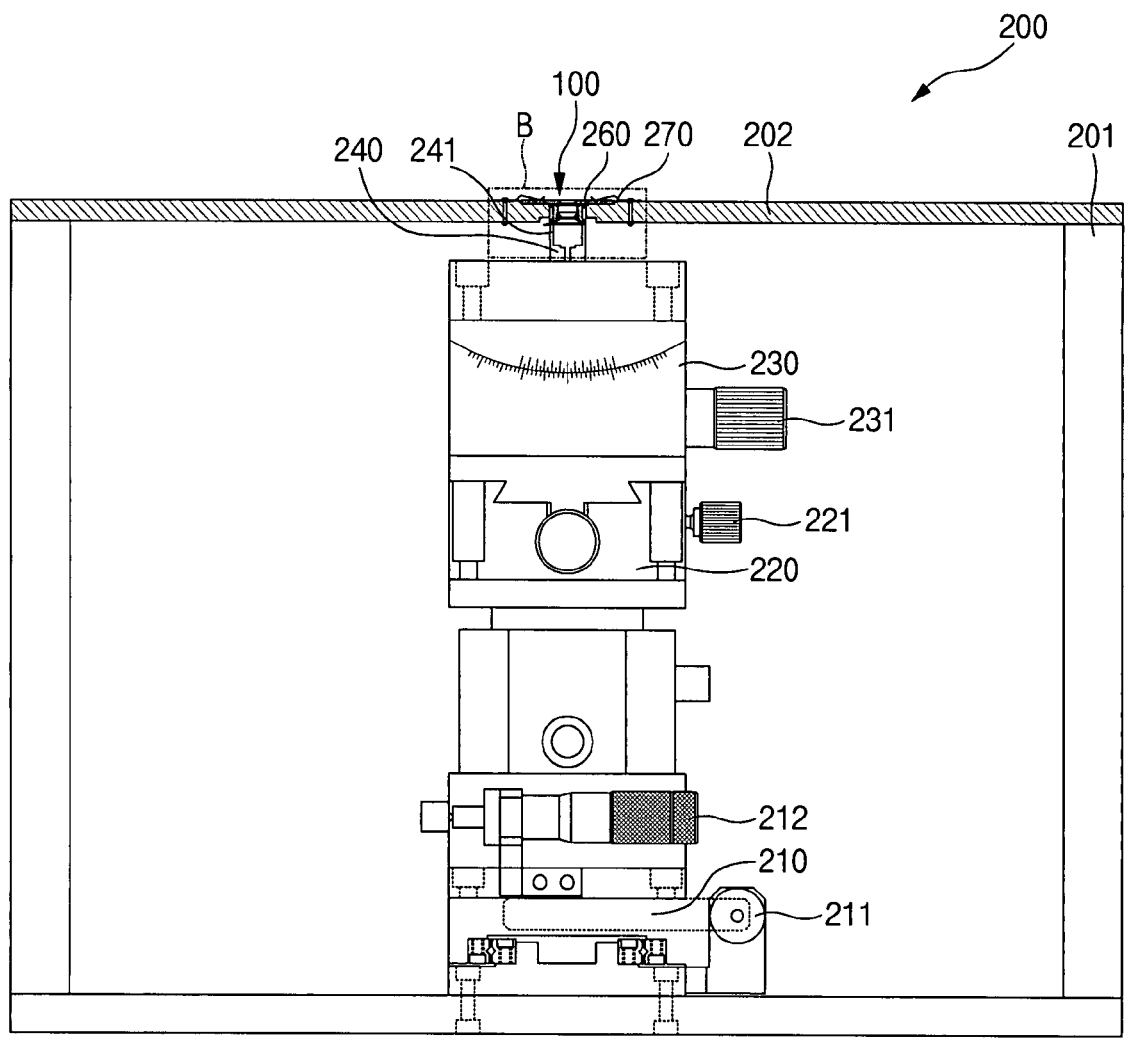
[FIG. 10]

[FIG. 11]
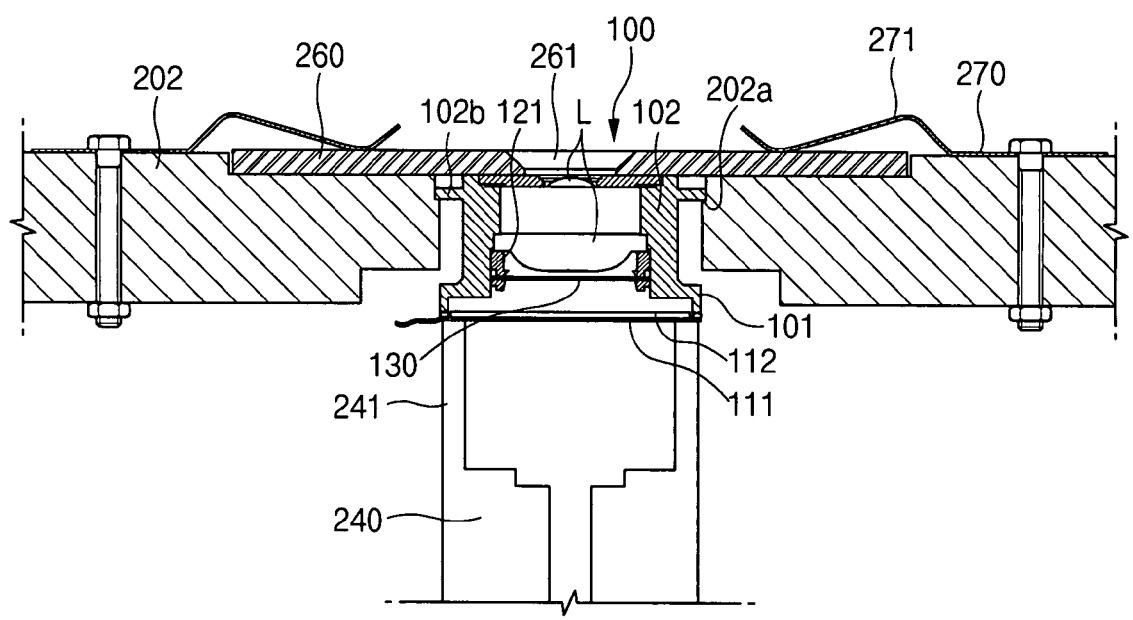

[FIG. 12]
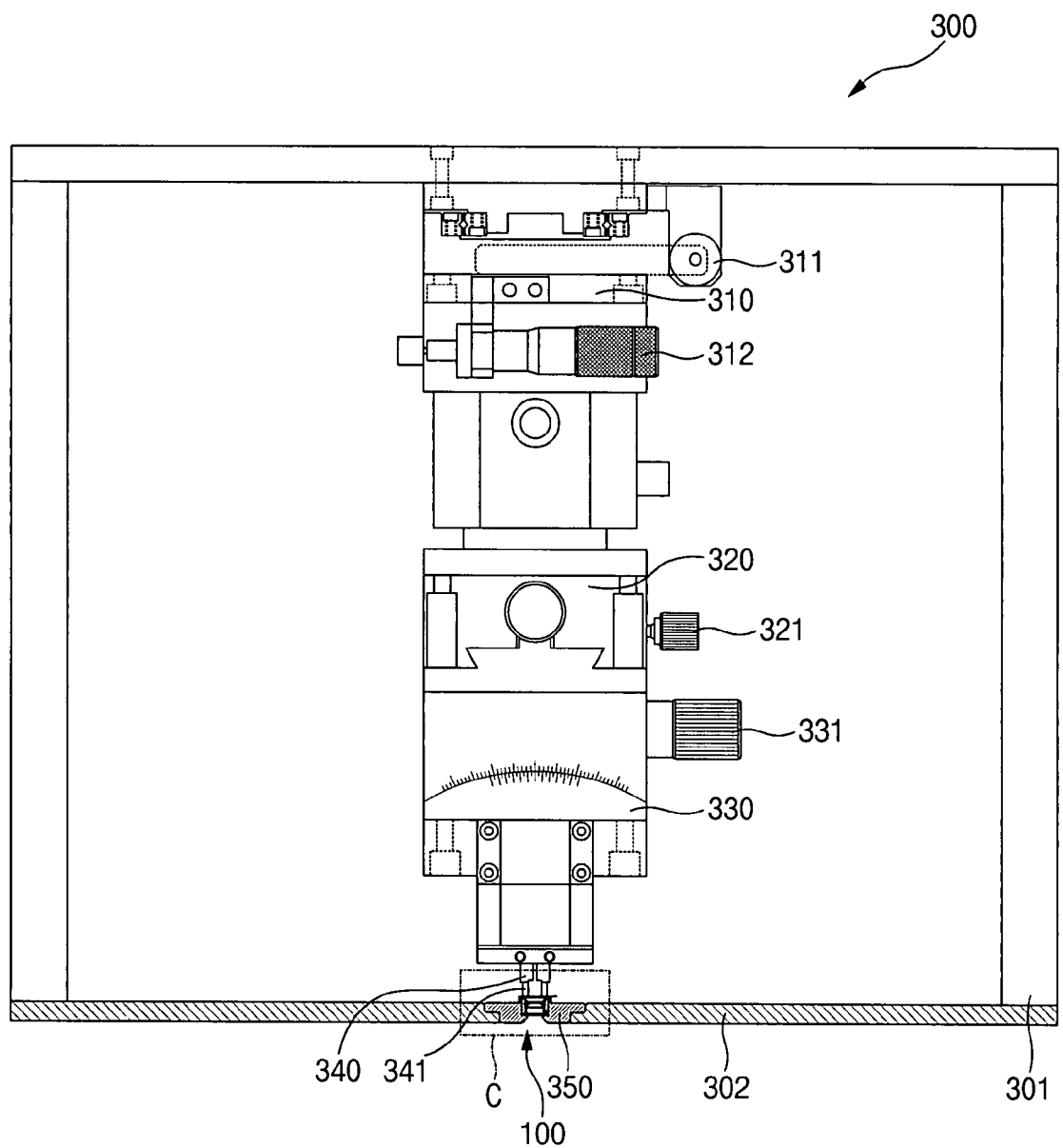

[FIG. 13]
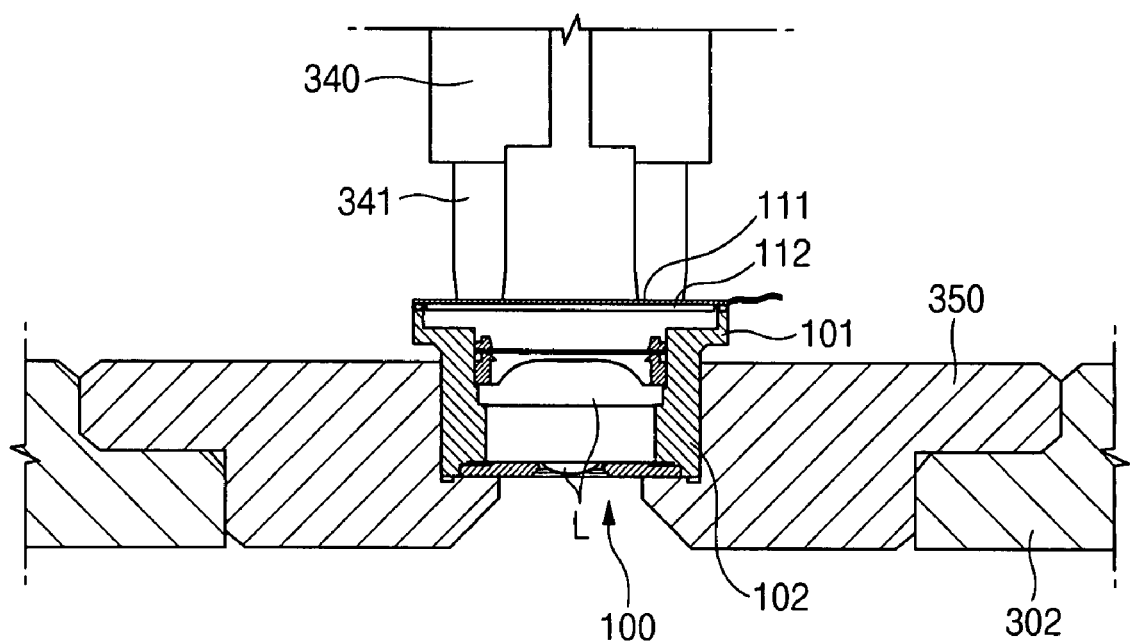

APPARATUS FOR ASSEMBLING CAMERA MODULE

CROSS-REFERENCE TO RELATED APPLICATIONS

This application claims the benefit of Korean Patent Application No. 10-2006-0077674 filed with the Korea Intellectual Property Office on Aug. 17, 2006, the disclosure of which is incorporated herein by reference.

BACKGROUND OF THE INVENTION

1. Field of the Invention

The present invention relates to an apparatus and a method for assembling a camera module, which adjusts a focus is performed by adjusting three axes of an image sensor module which is closely attached to a lower portion of a barrel-integrated housing disposed in a jig.

2. Description of the Related Art

With the recent development of mobile terminals such as portable phones and personal digital assistants (PDAs), the mobile terminals provide a phone call function and are used as multi-convergence devices. The most representative of the multi-convergence devices is a camera module. The resolution of the camera module changes from 300,000 pixels (VGA) to 8,000,000 pixels. Moreover, the camera module provides various additional functions, such as auto-focusing (AF) and optical zoom. Generally, camera modules are applied to various IT devices, such as camera phones, smart phones, and mobile communication terminals.

The camera modules are manufactured by using main parts of charge coupled device (CCD) or complementary metal oxide semiconductor (CMOS) image sensors. Incident light transmitted through the lens is condensed by the image sensor and is stored as data in a memory. The stored data is displayed as an image through a display medium, such as liquid crystal display (LCD) or PC monitor.

Typical camera modules are manufactured by a Chip On Film (COF) method, a Chip On Board (COB) method and the like. The COF method and the COB method will be described with reference to drawings.

FIG. 1 is an exploded perspective view of a conventional COF type camera module, and FIG. 2 is a partial sectional view of the conventional COF type camera module of FIG. 1.

Referring to FIGS. 1 and 2, the conventional camera module 1 includes an image sensor 3 for converting an image signal inputted through a lens into an electric signal, a housing 2 for supporting the image sensor 3, a lens group 4 for collecting an image signal of an object in the image sensor 3, and a barrel 5 in which the lens group 4 is stacked in multi-layers.

A flexible printed circuit board (FPCB) 6 is electrically connected to a lower portion of the housing 2. Chip components (e.g., condensers and resistors) for driving the CCD or CMOS image sensor 3 are mounted on the FPCB 6.

In the camera module 1, an anisotropic conductive film (ACF) 8 is inserted between the FPCB 6 and the image sensor 3 in such a state that a plurality of circuit components are mounted on the FPCB 6. Then, heat and pressure are applied to electrically attach the FPCB 6 to the image sensor 3, and an IR filter 7 is attached on the FPCB 6.

Furthermore, in such a state that the barrel 5 and the housing 2 are provisionally screwed to each other, the assembled FPCB 6 is fixed to the bottom surface of the housing 2 by a separate adhesive.

Meanwhile, after the housing 2 to which the FPCB 6 and the barrel 5 are coupled is fixed by an adhesive, an object (resolution chart) is set at a predetermined distance in front of the barrel 5 so as to perform focus adjustment. The focus adjustment of the camera module 1, that is, the focus adjustment between the lens group 4 and the image sensor 3 is performed as a vertical transfer amount of the barrel 5 is adjusted by rotating the barrel 5 screwed to the housing 2.

At this time, the focus adjustment is performed in a state where the distance from the object is set at 50 cm to the infinity. After the focus is finally adjusted, the housing 2 and the barrel 5 is bonded and fixed to each other by an adhesive injected therebetween.

However, when the barrel 5 screwed to the housing 2 is rotated and vertically transferred in order to adjust the focus of an image formed in the image sensor 3 after the barrel 5 having the lens group 4 mounted therein is assembled into the housing 2, foreign matters such as particles, generated by friction at the screw-connection portion between the barrel 5 and the housing 2, drop down onto the upper surface of the IR filter 7 or the image sensor 3.

Further, the assembling of the FPCB 6 and the housing 2 is determined on the basis of the IR filter 7, which means that the IR filter 7 plays an important roll of adjusting the centers of the image sensor 3 and the lens group 4. Therefore, the mounting position of the IR filter 7 has a large effect upon foreign matters.

That is, as the IR filter 7 is mounted adjacent to the image sensor 3, foreign matters dropping onto the upper surface of the IR filter 7 can be easily recognized. On the contrary, as the IR filter 7 becomes distant from the image sensor 3, an effect caused by foreign matters becomes insensible. Therefore, the camera module needs to be designed in such a manner that the IR filter 7 and the image sensor 3 are spaced at a proper distance from each other.

FIGS. 3 and 4 are diagrams showing a camera module manufactured by the COB method. FIG. 3 is a cross-sectional view of a conventional camera module manufactured by the COB method, and FIG. 4 is an exploded perspective view of the camera module.

In the conventional camera module 10, a printed board 11 having a CCD or CMOS image sensor 12 mounted thereon by wire bonding is coupled to a lower portion of a housing 13 formed of plastics, and a lens barrel 16 having a cylindrical body 15 extending downward is coupled to a barrel 14 extending from the housing 13.

In the camera module 10, the housing 13 and the lens barrel 16 are coupled to each other by coupling a female screw 14a formed on the inner circumferential surface of the barrel 14 to a male screw 15a formed on the outer circumferential surface of the cylindrical body 15.

At this time, an infrared ray (IR) filter 18 is disposed between a lens L mounted in a lower end portion of the lens barrel 16 and the image sensor 12 attached on the printed board 11, the IR filter 18 blocking long-wavelength infrared rays incident on the image sensor 12.

In the camera module assembled in such a manner, while light incident from a specific object passes through the lens L, an image is inverted so that the focus is adjusted on the surface of the image sensor 12. At this time, when a focus is optimally adjusted while the lens barrel 16 screwed to the upper end of the housing 13 is rotated, an adhesive is injected between the housing 13 and the lens barrel 16 such that the housing 13 and the lens barrel 16 are bonded to each other. Then, the camera module is finalized.

In the above-described COF and COB methods, the lens barrel 5 or 16 is inserted through the upper opening of the housing 2 or 13 and is then closely attached through the screw coupling using male and female screws formed on the inner and outer circumferences of the respective members. Further, as the height of the lens barrel 5 or 16 is adjusted at the upper end of the housing 2 or 13 by rotating the lens barrel 5 or 16, the focus adjustment between the lens L within the lens barrel 5 or 16 and the image sensor 3 or 12 mounted on the printed board 6 or 11 is performed.

Therefore, in the conventional camera modules manufactured by the above-described assembling methods, when the housing 2 or 13 and the lens barrel 5 or 16 are vertically coupled, and if the male and female screws are engaged at a distorted angle, screw threads can be broken or the coupling portion can be worn away by the friction between the male and female screws. Then, foreign matters such as minute particles can be generated, thereby degrading the assembling property.

The particles generated between the housing 2 or 13 and the lens barrel 5 or 16 inevitably drop down onto the upper surface of the IR filter 7 or 18 or onto the light reception region of the image sensor 3 or 12. Therefore, when an image is reproduced by the image sensor 12, the particles have a large effect on the image.

Further, since the housing 2 or 13 and the lens barrel 5 or 16 are coupled through screws, the lens can be tilted along the angle of the screw formed on the lens barrel 5 or 16 when the lens barrel 5 or 16 is rotated.

SUMMARY OF THE INVENTION

An advantage of the present invention is that it provides an apparatus for assembling a camera module, in which a focus is adjusted by position adjustment of three axes using a jig in a state where a PCB having an image sensor mounted thereon is temporarily attached to a lower portion of a barrel-integrated housing disposed on the jig.

Another advantage of the invention is that it provides a method for assembling a camera module.

Additional aspect and advantages of the present general inventive concept will be set forth in part in the description which follows and, in part, will be obvious from the description, or may be learned by practice of the general inventive concept.

According to an aspect of the invention, an apparatus for assembling a camera module comprises a support frame that is formed in a rectangular shape and has a jig horizontally connected to an upper end thereof; a plurality of stages that are vertically stacked and installed in the support frame and adjust a printed circuit board (PCB) in three-axis directions; a board holder that is formed to extend from one end of the uppermost stage and has the PCB mounted on the extending end thereof; and a jig assembly that is disposed on an opening of the jig and has a barrel-integrated housing mounted on the central portion thereof.

Preferably, the plurality of stages are composed of an X-Y stage for horizontally transferring the PCB fixed to the board holder, a Z stage for vertically transferring the PCB, and a gonio stage for adjusting a tilt angle with respect to the center of the PCB and are vertically installed in an optical-axis direction. The X-Y stage has X- and Y-axis adjustment knobs, the Z stage has a Z-axis adjustment knob, and the gonio stage has a tilt adjustment knob.

Preferably, the jig assembly disposed on the jig has a guide projection formed in a lower portion of either side thereof such that the mounting position of the jig assembly is guided on the jig.

Preferably, the board holder has a pair of adjustment pins projecting from the extending end, and ends of the adjustment pins are inserted into pin fixing holes formed on the bottom surface of the PCB such that the PCB is fixed to the board holder.

Preferably, the housing disposed on the jig assembly has coupling grooves formed on the outer circumferential surface of the barrel integrally connected to the housing, and the jig assembly, against which the outer circumferential surface of the barrel is pressed, has coupling projections formed on the inner surface of the jig assembly, the coupling projections being coupled to the coupling grooves.

Preferably, the jig assembly has a pair of elastic springs mounted in both sides of the barrel disposed in the center portion thereof such that the outer circumferential surface of the barrel is elastically supported.

According to another aspect of the invention, an apparatus for assembling a camera module comprises a support frame that is formed in a rectangular shape and has a jig horizontally connected to an upper end thereof; a plurality of stages that are vertically stacked and installed in the support frame and adjust a PCB in three-axis directions; a board holder that is formed to extend from one end of the uppermost stage and has the PCB mounted on the extending end thereof; a press fixing plate that has a barrel-integrated housing mounted in an opening of the jig and covers the upper portion of the housing and a portion of the jig; and a pair of plate springs that elastically support the upper surface of the press fixing plate.

Preferably, the plurality of stages are composed of an X-Y stage for horizontally transferring the PCB fixed to the board holder, a Z stage for vertically transferring the PCB, and a gonio stage for adjusting a tilt angle with respect to the center of the PCB and are vertically installed in an optical-axis direction. The X-Y stage has X- and Y-axis adjustment knobs, the Z stage has a Z-axis adjustment knob, and the gonio stage has a tilt adjustment knob.

Preferably, the board holder has a pair of adjustment pins projecting from the extending end, and ends of the adjustment pins are inserted into pin fixing holes formed on the bottom surface of the PCB such that the PCB is fixed to the board holder.

Preferably, the housing has lock projections formed in both sides of the barrel integrally connected to the housing, the lock projections being locked to step portions formed on the inner circumferential surface of the jig.

Preferably, the press fixing plate has a through-hole formed in the central portion thereof such that external light is incident through lenses mounted in the barrel of the housing.

Preferably, one ends of the plate springs are fixed to the upper surface of the jig through screws, and the upper surface of the press fixing plate is elastically supported by elastic supports of the plate springs extending inwardly.

According to a further aspect of the invention, an apparatus for assembling a camera module comprises a support frame that is formed in a rectangular shape and has a jig horizontally connected to an upper end thereof; a plurality of stages that are vertically stacked and installed in the support frame and adjust a PCB in three-axis directions; an air holder that is formed to extend from one end of the lowermost stage and has a PCB suction-fixed to the extending end thereof; and a jig assembly that is disposed in an opening of the jig and has a barrel-integrated housing mounted on the central portion thereof.

Preferably, the plurality of stages are composed of an X-Y stage for horizontally transferring the PCB fixed to the board holder, a Z stage for vertically transferred the PCB, and a gonio stage for adjusting a tilt angle with respect to the center of the PCB and are vertically installed in an optical-axis direction. The X-Y stage has X- and Y-axis adjustment knobs, the Z stage has a Z-axis adjustment knob, and the gonio stage has a tilt adjustment knob.

Preferably, the air holder has a pair of suction nozzles extending from the extending end thereof.

According to a still further aspect of the invention, a method for assembling a camera module comprises disposing a barrel-integrated housing on a jig assembly and mounting the jig assembly on a jig of a support frame; sequentially stacking a plurality of lenses and an Infrared Ray (IR) filter in the housing; mounting a PCB with an image sensor on a board holder extending to the outside of a gonio stage installed in the support frame; attaching the PCB on a lower opening of the housing and adjusting three axes of the PCB by manipulating adjustment knobs provided in an X-Y stage, a Z-stage, and the gonio stage such that the focus between the lenses and the image sensor is optimally adjusted; and bonding the PCB to the housing.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is an exploded perspective view of a conventional camera module manufactured by a COF method;

FIG. 2 is a partial sectional view of the conventional camera module of FIG. 1;

FIG. 3 is a cross-sectional view of a conventional camera module manufactured by a COB method;

FIG. 4 is an exploded perspective view of the conventional camera module of FIG. 3;

FIG. 5 is a cross-sectional view of a camera module according to the invention;

FIG. 6 is a bottom view of a printed circuit board (PCB) mounted on the camera module according to the invention;

FIG. 7 is a cross-sectional view of a camera module according to another embodiment of the invention;

FIG. 8 is a diagram showing the construction of an apparatus for assembling a camera module according to a first embodiment of the invention;

FIG. 9 is an expanded view of a portion A of FIG. 8;

FIG. 10 is a diagram showing the construction of an apparatus for assembling a camera module according to a modification of the first embodiment of the invention;

FIG. 11 is an expanded view of a portion B of FIG. 10;

FIG. 12 is a diagram showing the construction of an apparatus for assembling a camera module according to a second embodiment of the invention; and FIG. 13 is an expanded view of a portion C of FIG. 12.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Structure of Camera Module

FIG. 5 is a cross-sectional view of a camera module according to the invention, and FIG. 6 is a bottom view of a Printed Circuit Board (PCB) mounted on the camera module according to the invention.

As shown in FIG. 5, the camera module 100 has such a structure that an image sensor module 110 is closely attached, through an adhesive 104, to a lower portion of a housing 101 to which a cylindrical barrel 102 is integrally connected.

The image sensor module 110 has an image sensor 112 mounted on the central portion of a PCB 111 including a Flexible Printed Circuit Board (FPCB), and the edge portion of the PCB 111 is closely attached to a lower end of the housing 101 through an adhesive 104.

The cylindrically barrel 102, which is integrally connected to the housing 101, has a plurality of lenses L stacked therein and coupled to each other. The housing 101 has an Infrared Ray (IR) filter 120 mounted therein, the IR filter 120 preventing infrared rays from being excessively incident through the lens group L.

The lens group L is fixed inside the barrel 102 through an indentation ring 121. As an adhesive is injected into a step portion 121a formed on the indentation ring 121 and is then solidified, the fixing of the lens group L is achieved.

The PCB 111, which is closely attached to the lower portion of the housing 101, has the image sensor 112 mounted on the central portion thereof by wire bonding or the like. As shown in FIG. 6, the PCB 111 has pin fixing holes 111a provided in both sides of the bottom surface thereof.

The PCB 111 is horizontally and vertically transferred by a separate jig, which will be described below, in a state where the PCB 111 is horizontally attached to the lower end of the housing 101. Then, a distance from the lens L is adjusted, and a tilt angle is adjusted with respect to the center of the PCB 111.

At this time, as adjustment pins of a camera module assembling apparatus is inserted into the holes 111a formed on the bottom surface of the PCB 111, the PCB 111 is fixed. Further, as the adjustment pins are moved, the PCB is moved in each movable direction.

Therefore, the focus between the lens group L stacked in the barrel 102 of the housing 101 and the image sensor 112 mounted in the central portion of the PCB 111 is adjusted. Further, as the adhesive 104 injected between the lower end of the housing 101 and the PCB 111 is solidified, the housing 101 and the PCB 111 are closely attached to each other, so that the camera module 100 is completely manufactured.

In some cases, the PCB 111 may have a bottom surface formed of a flat surface where the holes 111a are not provided. In this case, a holder (not shown) using suction of air is provided on the bottom surface of the PCB 111 such that the PCB 111 is fixed to an end of the holder through vacuum suction. Then, the PCB 111 can be moved to adjust a focus.

FIG. 7 is a cross-sectional view of a camera module according to another embodiment of the invention. As shown in FIG. 7, a plurality of lenses L are stacked and coupled inside a barrel 102 which is integrally connected to a housing 101. Further, a first indentation ring 121 is closely attached to the inner circumferential surface of the barrel 102 and the lower surface of the lens L, and an IR film 130 is fixed through a second indentation ring 122 pressed against the lower surface of the first indentation ring 121.

The first indentation ring 121 is closely attached to prevent the lens group including the lowermost lens L in the barrel 102 from coming off. In this case, like the embodiment shown in FIG. 5, an adhesive is injected onto a step portion 121a formed on the outer circumferential surface of the first indentation ring 121 and is then solidified. Therefore, the lens group L is fixed inside the barrel 102 and is prevented from coming off and moving inside the barrel 102.

Under the first indentation ring 121, the disk-shaped IR film 130 and the second indentation ring are sequentially stacked and coupled. That is, the upper and lower edges of the IR film 130 are pressed by the pair of indentation rings 121 and 122 such that IR film 130 is mounted in a lower portion of the barrel 102 at a level with the lens group L.

To enhance bonding performance, the second indentation ring 122 has a protrusion 122a formed toward the inner circumferential surface of the barrel 102. In a state where the second indentation ring 122 is attached on the lower surface of the IR film 130, an adhesive is injected onto the protrusion 122a of the second indentation ring 122. Then, as the adhesive is solidified, the second indentation ring 122 is fixed to the barrel 102.

As for the adhesive for fixing the first and second indentation rings 121 and 122, it is preferable to use epoxy or Ultra Violet (UV) adhesive which is cured by irradiating ultraviolet rays.

The IR film 103 pressed between the first and second rings 121 and 122 is formed of polymer-based transparent synthetic resin. The IR film 103, which is cut out so that the outer circumferential surface thereof can be closely attached to the inner circumferential surface of the barrel 102, is disposed in the barrel 102, thereby blocking infrared rays included in incident light passing through the lens group L.

Preferably, the IR film 130 has a thickness of 90 to 100 μm such that the central portion thereof does not droop.

In the camera module 100 according to this embodiment, the PCB 111 is horizontally and vertically transferred by a separate jig, in a state where the PCB 111 is horizontally attached to the lower end of the housing 101, like the embodiment shown in FIG. 5. Then, the distance from the lens group L is adjusted, and a tilt angle is adjusted by reference to the center of the PCB 111. Accordingly, the focus between the lens group L and the image sensor 112 is adjusted.

Apparatus for Assembling Camera Module

First Embodiment

FIG. 8 is a diagram showing the construction of an apparatus for assembling a camera module according to a first embodiment of the invention, and FIG. 9 is an expanded view of a portion A of FIG. 8.

As shown in FIG. 8, the apparatus 200 for assembling a camera module includes a support frame 201 formed in a rectangular shape, an X-Y stage 210, a Z stage 220, a gonio stage 230, a board holder 240 which is formed to extend from the gonio stage 230 and has a PCB 111 fixed to an end thereof, and a jig assembly 250 disposed on a jig 202 on the support frame 201. The X-Y stage 210, the Z stage 22, and the gonio stage 220 are installed in the support frame 201.

The jig assembly 250 having a barrel-integrated housing 101 mounted in the central portion thereof is disposed in an opening of the jig 202.

The support frame 201 supports the jig 202, which is horizontally connected to the upper end of the support frame 201, at a predetermined height from the ground. Simultaneously, the support frame 201 vertically supports the respective stages 210, 220, and 230 installed in multi-layers.

The jig assembly 250 has guide projections 251 formed in both lower portions thereof, the guide projections 251 guiding the mounting position of the jig assembly 250 on the jig 202.

Inside the support frame 201, the X-Y stage 210 having an X-axis adjustment knob 211 and a Y-axis adjustment knob 212, the Z stage 220 having a Z-axis adjustment knob 221, and the gonio stage 230 having a tilt adjustment knob 231 are vertically stacked and installed in an optical-axis direction.

The respective stages 210, 220, and 230 are installed in such a manner that axes (not shown) moved by adjusting the plurality of adjustment knobs 211, 212, 213, and 231 are connected to each other. Further, a board holder 240 is formed to extend toward the outside of the gonio stage 230 from one end of the axis and is moved in accordance with the movement of the axis.

The board holder 240 has a pair of adjustment pins 241 projecting from the extending end thereof. The ends of the adjustment pins 241 are inserted into the holes 111a formed on the bottom surface of the PCB 111 such that the PCB 111 is fixed to the board holder 240.

The position of the board holder 240 is adjusted so that the PCB 111 is closely attached to the lower portion of the housing 101 mounted on the jig assembly 250 which is disposed on the jig 202. Specifically, the horizontal position of the board holder 240 is adjusted by the X- and Y-axis adjustment knobs 211 and 212, and the vertical position of the board holder 240 is adjusted by the Z-axis adjustment knob 221.

That is, the board holder 240 is horizontally and vertically transferred by manipulating the respective adjustment knobs 211, 212, and 221 provided in the X-Y stage 210 and the Z stage 220, and thus the position of the PCB 111 is adjusted.

Further, X- and Y-axis tilt angles with respect to the center of the PCB are adjusted by the tilt adjustment knob 231 provided in the gonio stage 230. That is, tilt adjustment is achieved.

At this time, when the PCB 111 is closely attached to the lower end of the housing 101, the center of the PCB 111 fixed to the ends of the adjustment pins 241 of the board holder 240 coincides with an optical axis passing through the lens group L mounted in the housing 101.

Meanwhile, the housing 101 having the PCB 111 attached to the lower end thereof is mounted on the central portion of the jig assembly 250, and the jig assembly 250 is disposed on the jig 202 in a state where the outer circumferential surface of the barrel 102 extending from the housing 101 is pressed against the central portion of the jig assembly 250.

To reliably mount the housing 101 into the jig assembly 250, it is preferable that coupling grooves 102a are formed on both sides of the barrel 102, and simultaneously, coupling projections 251 are provided on the inner surface of the jig assembly 250, against which the outer circumferential surface of the barrel 102 is pressed. The coupling projections 251 are coupled to the coupling grooves 102a such that the housing 101 is reliably mounted into the jig assembly 250.

Further, the jig assembly 250 has a pair of springs 252 mounted in both sides of the barrel 102. The springs 252 elastically support the outer circumferential surface of the barrel 102 such that coming-off of the housing 101, caused by pressure applied from the Z stage 230 when the PCB 111 is transferred in the Z-axis direction, is prevented.

Preferably, in a state where an adhesive is applied between the lower end of the housing 101 and the PCB 111 and is then temporarily solidified, focus adjustment is performed by the transferring of the PCB 111 in each direction and the tilt adjustment.

In the above-described apparatus 200 for assembling a camera module according to this embodiment, the jig assembly 250 having the barrel-integrated housing 101 mounted thereon is disposed on the jig 202 provided in the upper end of the support frame 201, the PCB 111 fixed to the board holder 240 is positioned under the housing 101 such that the housing 101 and the PCB are bonded to each other, and the focus is adjusted by the coincidence between the optical axis of the lens group L and the center of the image sensor 112 and the distance adjustment inside the barrel 102. A specific assembling method will be described below.

Modification of First Embodiment

FIG. 10 is a diagram showing the construction of an apparatus for assembling a camera module according to a modification of the first embodiment of the invention, and FIG. 11 is an expanded view of a portion B of FIG. 10.

The same technical construction of the modification as that of the first embodiment will not be described, and like reference numerals will be attached to the same components of the modification as those of the first embodiment.

As shown in FIG. 8, the apparatus 200 for assembling a camera module according to the modification includes a barrel-integrated housing 101 mounted on a jig 202 connecting the upper ends of a support frame 201 and a press fixing plate 260 mounted to cover the upper portion of the housing 101 and a portion of the jig 202.

The housing 101 has lock projections 102b formed in both sides of the barrel 102, the lock projections 102b projecting in such a range that mounting the housing 101 into a mobile terminal is not interrupted. The lock projections 102 are locked to step portions 202a formed on the inner circumferential surface of the jig 202.

The housing 101 has a PCB 111 attached to the lower end thereof, the PCB 111 being mounted on a board holder 240 extending from a gonio stage 230 within the support frame 201. The PCB 111 is moved in accordance with the movement of the board holder 240. Like the first embodiment, the board holder 240 is driven by manipulating adjustment knobs 211, 212, 221, and 231 provided in the X-Y stage 210, the Z-stage 220, and the gonio stage 230 which are stacked and installed in the support frame 201.

The press fixing plate 260, which covers the upper portion of the housing 101 disposed on the jig 202, is fixed by a pair of plate springs 270 and has a through-hole 261 formed in the central portion thereof such that external light can be incident through the lens group L mounted in the barrel 102 of the housing 101.

One end of the plate spring 270 is fixed to the upper surface of the jig 202 through a screw, and an elastic support 271 of the plate spring 270, which extends inwardly, elastically supports the upper surface of the press fixing plate 260. This is for elastically supporting the housing 101 against an external force applied to the lower portion of the housing 101 from the board holder 240 when the PCB 111 is moved in the Z-axis direction to adjust a focus, like the first embodiment.

In a state where the PCB 111 fixed to the board holder 240 is bonded to the lower end of the housing 101, the focus adjustment which is achieved by the position adjustment of the PCB 111 and the tilt adjustment is performed the same as the first embodiment.

Second Embodiment

FIG. 12 is a diagram showing the construction of an apparatus for assembling a camera module according to a second embodiment of the invention, and FIG. 13 is an expanded view of a portion C of FIG. 12.

As shown in FIG. 12, the apparatus 200 for assembling a camera module according to the second embodiment includes a support frame 301, a jig assembly 350 disposed on a jig 302 connecting lower ends of the support frame 301, an X-Y stage 310, a Z stage 320, a gonio stage 330, and an air holder 340 which extends to the outside of the gonio stage 330 and has a PCB 111 fixed to an end thereof. The respective stages are installed in the support frame 301. The X-Y stage 310 has an X-axis adjustment knob 311 and a Y-axis adjustment knob 312, the Z-stage 320 has a Z-axis adjustment knob 321, and the gonio stage 330 has a tilt adjustment knob 331.

The jig assembly 350 having a barrel-integrated housing 101 mounted on the central portion thereof is disposed in an opening of the jig 302.

Inside the support frame 302, the X-Y stage 310, the Z-stage 320, and the gonio stage 330 are vertically stacked and installed in an optical-axis direction of lenses L mounted in the housing 101.

The respective stages 310, 320, and 330 are installed in such a manner that axes (not shown) moved by adjusting the plurality of adjustment knobs 311, 312, 321, and 331 are connected to each other. The air holder 340 is formed to extend from one end of the axis toward the lower portion of the gonio stage 330 and is moved in accordance with the movement of the axis.

The air holder 340 has a pair of suction nozzles 341 formed at the extending ends thereof. The ends of the suction nozzles 341 are suction-fixed to the bottom surface of the PCB 111 such that the PCB 111 is fixed to the air holder 340.

The barrel-integrated housing 101 is mounted on the jig assembly 350 disposed on the jig 302 such that a lower opening thereof faces upward, and the PCB 111 is closely attached to the upper end of the opening.

Since the position of the PCB 111 is adjusted in such a manner that a focus is adjusted to the lower opening of the housing 101 mounted upside down on the jig assembly 350, the horizontal position of the air holder 350 is adjusted by manipulating the X- and Y-axis adjustment knobs 311 and 312, and the vertical position of the air holder 350 is adjusted by manipulating the Z-axis adjustment knob 321.

That is, the air holder 350 is horizontally and vertically transferred by manipulating the respective adjustment knobs 311, 312, and 321 provided in the X-Y stage 310 and the Z stage 320, and thus the position of the PCB 111 is adjusted.

Further, X- and Y-axis tilt angles with respect to the center of the PCB 111 are adjusted by the tilt adjustment knob 331 provided in the gonio stage 330.

Meanwhile, it is preferable that any one of the X-Y stage 310, the Z stage 320, and the gonio stage 330 has a suction motor (not shown) which is connected to the suction nozzles 341 of the air holder 340 so as to generate suction pressure and to maintain the generated pressure.

Method for Assembling Camera Module

A method of assembling the camera module assembling apparatus constructed in such a manner will be described, while being focused on the first embodiment.

First, the barrel-integrated housing 101 is disposed on the jig assembly 250 so as to be mounted on the jig 202, or is directly coupled to the jig 202 so as to be elastically coupled by the press fixing plate 260 and the plate springs 270.

At this time, the mounting direction of the housing 101 is determined in consideration of the mounting position of the jig assembly 250, that is, the installation positions of the jig 202 connecting the upper and lower ends of the support frame 201 and the respective stages 210, 220, and 230 for positioning the PCB 111.

Next, the plurality of lenses L and the IR filter 130 are sequentially stacked in the housing 101, and the lens group L is firmly fixed to the inside of the barrel 102 by the indentation ring 121. Further, the IR filter 130 can be manufactured in the form of film so as to be fixed under the lens group L.

Further, the PCB 111 having the image sensor 112 mounted thereon is mounted on the board holder 240 extending toward the outside of the gonio stage 230 installed in the support frame 201. In this case, the ends of the adjustment pins 241 of the board holder 240 are inserted into the pin fixing holes 111a provided on the bottom surface of the PCB 111 such that the PCB 111 is fixed to the board holder 240. Alternately, the bottom surface of the PCB 111 is suction-fixed to the air holder 340 having the suction nozzles 341. Then, in accordance with the movement of the holder 240 or 340, the PCB 111 is moved in each direction.

Next, the PCB 111 mounted on the board holder 240 is closely attached to the lower opening of the housing 101 with an adhesive 104 interposed therebetween. Then, the X-Y stage 210, the Z stage 220, and the gonio stage 230, which are installed in the support frame 102, are driven to adjust three axes (X, Y, and Z axes) and a tilt angle with respect to the center of the PCB 111 such that the focus between the lens group L and the image sensor 112 is optimally adjusted.

Finally, when the focus adjustment between the lens group L and the image sensor 112 is completed, the adhesive applied between the housing 101 and the PCB 111 is cured using ultraviolet rays or the like such that the housing 101 and the PCB 111 are bonded to each other. Then, the camera module is completely manufactured.

According to the invention, in a state where the PCB is temporarily bonded to the lower portion of the barrel-integrated housing disposed on the jig, the focus between the lens and the image sensor is adjusted by the position adjustment of three axes using the jig. Therefore, the number of parts can be lessened to reduce a unit cost of products, and the focus adjustment can be easily completed by only the position adjustment of the PCB.

Further, the PCB fixed through the pins or the suction nozzles is closely attached to the opening of the housing disposed on the jig, and the focus adjustment is performed by the plurality of stages. Therefore, the mass production of camera modules can be achieved. Further, man hours and operation time can be reduced, thereby enhancing productivity.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus for assembling a camera module, the apparatus comprising:
    a support frame that is formed in a rectangular shape and has a jig horizontally connected to an upper end thereof;
    a plurality of stages that are vertically stacked and installed in the support frame and adjust a printed circuit board (PCB) in three-axis directions, the plurality of stages being composed of an X-Y stage to horizontally transfer the PCB fixed to the board holder, a Z stage to vertically transfer the PCB, and a gonio stage to adjust a tilt angle with respect to the center of the PCB, the plurality of stages being vertically installed in an optical-axis direction, and the X-Y stage has X- and Y-axis adjustment knobs, the Z stage has a Z-axis adjustment knob, and the gonio stage has a tilt adjustment knob;
    a board holder that is formed to extend from one end of the uppermost stage and has the PCB mounted on the extending end thereof; and
    a jig assembly that is disposed on an opening of the jig and has a barrel-integrated housing mounted on the central portion thereof.

2. The apparatus according to claim 1, wherein the jig assembly disposed on the jig has a guide projection formed in a lower portion of either side thereof such that the mounting position of the jig assembly is guided on the jig.

3. The apparatus according to claim 1, wherein the board holder has a pair of adjustment pins projecting from the extending end, and ends of the adjustment pins are inserted into pin fixing holes formed on the bottom surface of the, PCB such that the PCB is fixed to the board holder.

4. The apparatus according to claim 1, wherein the housing disposed on the jig assembly has coupling grooves formed on the outer circumferential surface of the barrel integrally connected to the housing, and the jig assembly, against which the outer circumferential surface of the barrel is pressed, has coupling projections formed on the inner surface of the jig assembly, the coupling projections being coupled to the coupling grooves.

5. The apparatus according to claim 1, wherein the jig assembly has a pair of elastic springs mounted in both sides of the barrel disposed in the center portion thereof such that the outer circumferential surface of the barrel is elastically supported.

* * * * *